(12) United States Patent  
Tsuda

(10) Patent No.: US 9,307,157 B2  
(45) Date of Patent: Apr. 5, 2016

(54) LENS APPARATUS AND IMAGING APPARATUS DETACHABLE THEREFROM

(71) Applicant: CANON KABUSHIKI KAISHA, Tokyo (JP)

(72) Inventor: Yuji Tsuda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 13/973,899

(22) Filed: Aug. 22, 2013

(65) Prior Publication Data

US 2014/0055665 A1    Feb. 27, 2014

(30) Foreign Application Priority Data

Aug. 27, 2012  (JP) ................................. 2012-187064

(51) Int. Cl.
*H04N 5/235*  (2006.01)
*H04N 5/232*  (2006.01)
*H04N 5/238*  (2006.01)

(52) U.S. Cl.
CPC ......... *H04N 5/2353* (2013.01); *H04N 5/23209* (2013.01); *H04N 5/238* (2013.01); *H04N 5/23245* (2013.01)

(58) Field of Classification Search
CPC ............ H04N 5/2353; H04N 5/23209; H04N 5/23245; H04N 5/238
USPC ....................................................... 348/363
See application file for complete search history.

(56) References Cited

U.S. PATENT DOCUMENTS

| 5,999,752 | A | * | 12/1999 | Ueyama | ................. | G03B 7/097 396/170 |
| 7,961,245 | B2 | * | 6/2011 | Hirai | ...................... | G02B 7/102 348/229.1 |
| 8,169,535 | B2 | * | 5/2012 | Abe | ....................... | G03B 7/085 348/362 |
| 8,253,823 | B2 | * | 8/2012 | Shibuno | ............. | H04N 5/23209 348/231.4 |
| 8,830,353 | B2 | * | 9/2014 | Shibuno | ............. | H04N 5/23209 348/231.4 |
| 8,934,039 | B2 | * | 1/2015 | Nakata | ................... | G03B 17/14 348/333.01 |
| 2006/0067678 | A1 | * | 3/2006 | Senba | ..................... | G03B 17/00 396/529 |
| 2008/0267608 | A1 | * | 10/2008 | Kubota | .................. | H04N 5/232 396/374 |
| 2009/0284612 | A1 | * | 11/2009 | Abe | ....................... | G03B 7/085 348/221.1 |
| 2009/0309993 | A1 | * | 12/2009 | Hirai | ..................... | G02B 7/102 348/222.1 |
| 2011/0090393 | A1 | * | 4/2011 | Kawarada | .......... | H04N 5/23209 348/345 |
| 2012/0212635 | A1 | * | 8/2012 | Abe | ....................... | G03B 7/085 348/221.1 |

FOREIGN PATENT DOCUMENTS

JP              03-10580 A      1/1991

* cited by examiner

*Primary Examiner* — Pritham Prabhakher
(74) *Attorney, Agent, or Firm* — Canon USA, Inc. IP Division

(57) ABSTRACT

An imaging apparatus includes a sensor configured to photo-electrically convert light from an object to output a signal, a selection unit configured to select one of a first exposure control mode and a second exposure control mode having an exposure changing amount per unit time larger than that of the first exposure control mode, and a controller configured to perform control to transmit diaphragm control information generated based on the output signal from the sensor, first information, and second information to a connected lens unit, wherein the first information is about the exposure control mode selected by the selection unit, and the second information is speed information of a diaphragm unit corresponding to the lens unit.

8 Claims, 7 Drawing Sheets

LENS APPARATUS AND IMAGING APPARATUS DETACHABLE THEREFROM

BACKGROUND OF THE INVENTION

1. Field of the Invention

The present invention relates to a lens apparatus (lens unit) detachable from an imaging apparatus main body, the imaging apparatus main body (camera unit) from which the lens unit is detachable, and an imaging apparatus that includes the lens apparatus and the imaging apparatus main body.

2. Description of the Related Art

Recently, there has been produced a video camera that enables replacement of a lens unit. A feature of the product of this category is that a user can interchangeably use lens units of various features according to an object image to be captured. In such an interchangeable lens system, there has been discussed a system for controlling exposure. Specifically, an exposure state is detected on a camera unit side, and information for controlling a diaphragm of a lens unit side is generated on the camera unit side so that the exposure state can coincide with a predetermined value, and is transmitted to the lens unit side. The lens unit side controls the diaphragm based on the information for controlling the diaphragm, which has been received from the camera unit side (as discussed in Japanese Patent Application Laid-Open No. 3-10580).

However, in the conventional imaging apparatus, no consideration is given to the possibility that the responsiveness (light amount change per unit time) of the diaphragm, mounted in the lens unit, may be changed by the camera unit. As a result, a function of changing the responsiveness of exposure control cannot be realized.

SUMMARY OF THE INVENTION

According to an aspect of the present invention, an imaging apparatus includes a sensor configured to photoelectrically convert light from an object to output a signal, a selection unit configured to select one of a first exposure control mode and a second exposure control mode having an exposure changing amount per unit time larger than that of the first exposure control mode, and a controller configured to perform control to transmit diaphragm control information generated based on the output signal from the sensor, first information, and second information to a connected lens unit, wherein the first information is about the exposure control mode selected by the selection unit, and the second information is speed information of a diaphragm unit corresponding to the lens unit.

According to another aspect of the present invention, a lens unit including a lens includes a diaphragm unit configured to control exposure to adjust an incident light amount, a memory configured to store speed information for driving the diaphragm unit, and a controller configured to output the speed information stored in the memory to an external apparatus, wherein the controller controls the diaphragm unit based on diaphragm control information periodically transmitted from the external apparatus.

Further features and aspects of the present invention will become apparent from the following detailed description of exemplary embodiments with reference to the attached drawings.

DESCRIPTION OF THE EMBODIMENTS

A feature of the present invention is as follows. A lens unit having a diaphragm unit for controlling exposure to adjust a light amount to an imaging unit of a camera unit side includes a storage unit configured to store diaphragm responsiveness information regarding controllable responsiveness of the diaphragm unit. The camera unit includes a generation unit configured to generate diaphragm responsiveness information regarding responsiveness of the diaphragm unit by taking at least the diaphragm responsiveness information stored in the storage unit into consideration. Thus, based on the diaphragm responsiveness information generated by the generation unit of the camera unit side, the responsiveness of the diaphragm unit of the lens unit side can be controlled.

Figure 1:
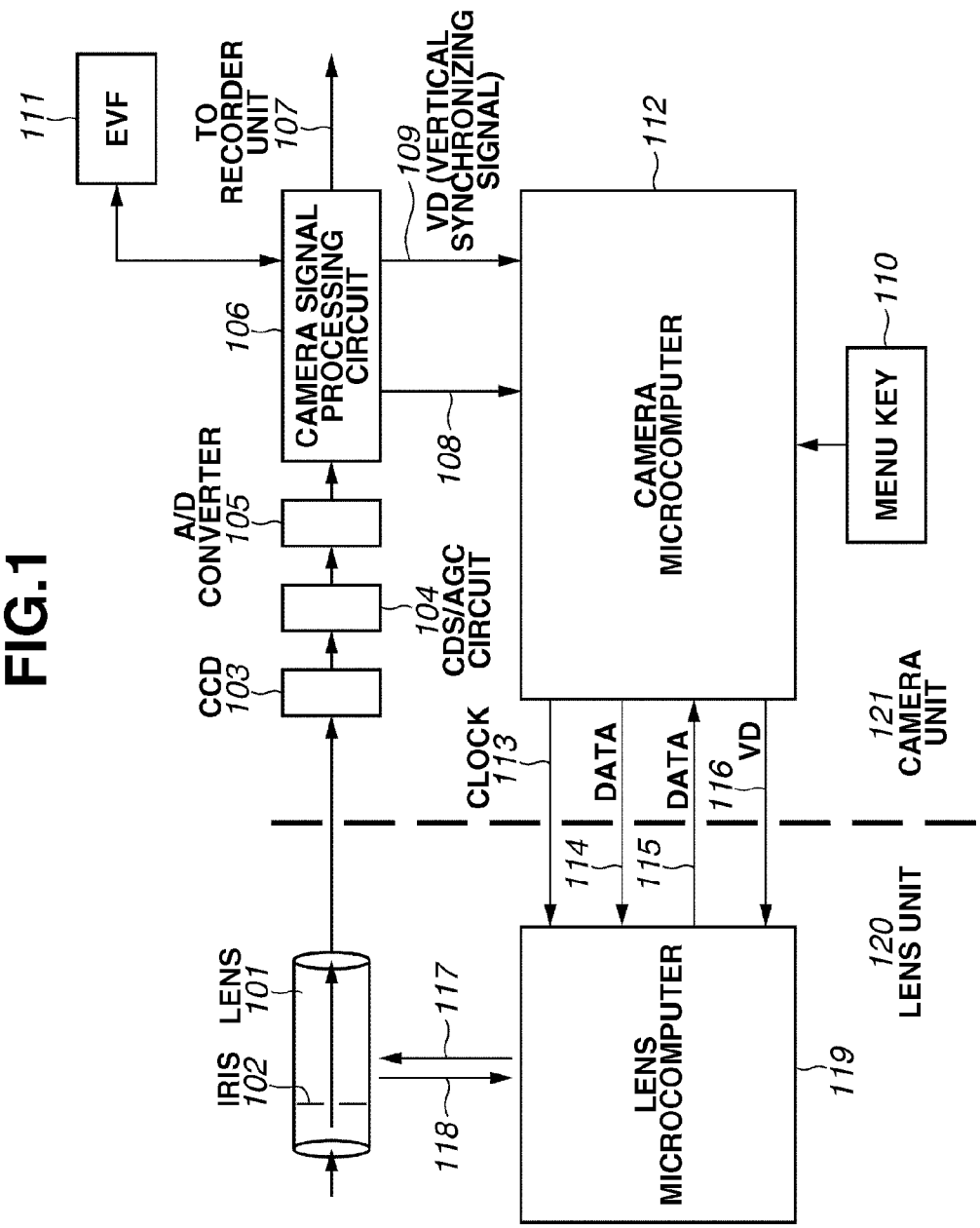
FIG. 1 is a block diagram illustrating an exemplary embodiment.

Exemplary embodiments of the present invention will be described with reference to the drawings. FIG. 1 is a block diagram illustrating an exemplary embodiment, which includes a lens unit 120 and a camera unit 121 in which the lens unit 120 is detachably mounted. The lens unit 120 includes an imaging lens 101, an iris 102, which is a diaphragm unit for controlling exposure to adjust a light amount to an imaging unit described below, an iris control signal path 117 for controlling an opening/closing operation of the iris 102, an iris F-number signal path 118 for electrically transmitting an F-number of the iris 102, and a lens microcomputer 119 for performing system control of the lens unit 120.

The camera unit 121 includes an image sensor 103, such as a charge-coupled device (CCD), which is an imaging unit for converting an optical image of an object into an electric signal, a correlated double sampling (CDS)/automatic gain control (AGC) circuit 104, an analog/digital (A/D) converter 105 for converting an analog video signal into a digital signal, a camera signal processing circuit 106, a signal path 107 to a recorder unit, a photometric value transmission path 108 for transmitting integration data of luminance information generated by the camera signal processing circuit 106 as a photometric value, a transmission path 119 for transmitting a vertical synchronizing signal (VD) generated by the camera signal processing circuit 106, a menu key 110 for performing setting concerning functions of the camera unit 121, an electronic viewfinder (EVF) 111 for displaying selection items to perform setting concerning the functions of the camera unit 121, a camera microcomputer 112 for performing system control of the camera unit 121, a clock line 113 that is a communication unit for performing transfer communication of various pieces of information (clock) between the camera microcomputer 112 and the lens microcomputer 119, data lines 114 and 115 that are communication units for performing transfer communication of various pieces of information (data) between the camera microcomputer 112 and the lens microcomputer 119. The data line 114 transmits data from the camera microcomputer 112 to the lens microcomputer 119, and the data line 115 transmits data from the lens microcomputer 119 to the camera microcomputer 112. The camera unit 121 also includes a line 116 for transmitting a communication VD.

A specific operation of the present exemplary embodiment will be described.

Light from an object for generating a video signal is image-formed by the lens 101, its light amount is adjusted by the iris 102, and the light is subjected to photoelectric conversion at the CCD 103. The video signal output from the CCD 103 enters the CDS/AGC circuit 104 to be provided with a predetermined gain, and is converted into a digital signal by the A/D converter 105 to enter the camera signal processing circuit 106. The video signal is subjected to camera signal processing at the camera signal processing circuit 106 to be output and is transmitted to the recorder unit via the signal path 107. The video signal image-captured by the user can be checked on the EVF 111.

A photometric value for controlling exposure is generated by the camera signal processing circuit 106 integrating a video luminance signal, and entered into the camera microcomputer 112 via the photometric value transmission path 108. A VD is generated in the camera signal processing circuit 106, and entered into the camera microcomputer 112 via a VD transmission path 109. The camera microcomputer 112 communicates with the lens microcomputer 119, and its timing is synchronized with the VD. The camera microcomputer 112 calculates, to perform exposure control by using the iris 102, an F-number to be targeted by the iris 102 so that the photometric value input via the photometric value transmission path 108 can always coincide with a predetermined standard exposure value correlated with a standard exposure state. The calculated F-number is transmitted to the lens microcomputer 119 by using the clock line 113, the data line 114, the data line 115, and the line (communication synchronizing signal line) 116.

The lens microcomputer 119, to which the F-number of the iris 102 is transmitted from the iris F-number signal path 118, controls the iris 102 via the iris control signal path 117 so that the transmitted F-number can consistently coincide with the target F-number transmitted from the camera microcomputer 112 by communication. When the user intentionally changes responsiveness of the iris 102 by an user's operation from the outside, responsiveness can be selected by selecting an iris responsiveness selection screen displayed on the EVF 111 via the menu key (selection unit) 110.

As described above, the camera unit that has the imaging unit configured to convert the optical image of the object into the electric signal includes the communication unit, the selection unit, and the generation unit. The communication unit allows mutual communication of information between the camera unit and the lens unit, which is detachable from the camera unit and includes the diaphragm unit and the storage unit configured to store the diaphragm responsiveness information regarding the controllable responsiveness of the diaphragm unit. The selection unit selects responsiveness of exposure control including control by the diaphragm unit, by an operation from the outside. The generation unit generates diaphragm responsiveness information regarding the responsiveness of the diaphragm unit from the responsiveness selected by the selection unit and the diaphragm responsiveness information transmitted via the communication unit and stored in the storage unit. The lens unit detachable from the camera unit includes the diaphragm unit, the communication unit, and the storage unit. The lens unit may include the following control unit. The control unit controls the responsiveness of the diaphragm unit based on the diaphragm responsiveness information generated by the generation unit of the camera unit side configured to generate the diaphragm responsiveness information regarding the responsiveness of the diaphragm unit from the responsiveness selected by the selection unit and the diaphragm responsiveness information stored in the storage unit.

Next, processing in a flowchart 1 according to the present exemplary embodiment and illustrated in FIG. 2 will be described. The flowchart 1 illustrates a sequence of communication from the lens microcomputer 119 to the camera microcomputer 112. In step S201, the camera microcomputer 112 detects a VD via the VD transmission path 109, generates a communication synchronizing signal (communicated via the communication synchronizing signal line 116) from the VD, and starts bidirectional communication with the lens microcomputer 119. Then, in step S202, the lens microcomputer 119 sets information stored beforehand in the storage unit of the lens microcomputer 119 and meaning that the iris 102 is controllable by the camera unit 121. Then, in step S203, the lens microcomputer 119 sets information (information about variable range of responsiveness) about a controllable minimum speed of the iris 102 and stored beforehand in the storage unit of the lens microcomputer 119. Accordingly, the diaphragm responsiveness information stored in the storage unit includes information about whether the diaphragm unit is controllable by the camera unit via the communication unit and the information about the variable range of the controllable responsiveness of the diaphragm unit.

In step S204, the lens microcomputer 119 obtains an F-number signal of the iris 102 via the iris F-number signal path 118 to set it as F-number information. In step S205, the lens microcomputer 119 transmits the pieces of information set in steps S202, S203, and S204 to the camera microcomputer 112.

Figure 3:
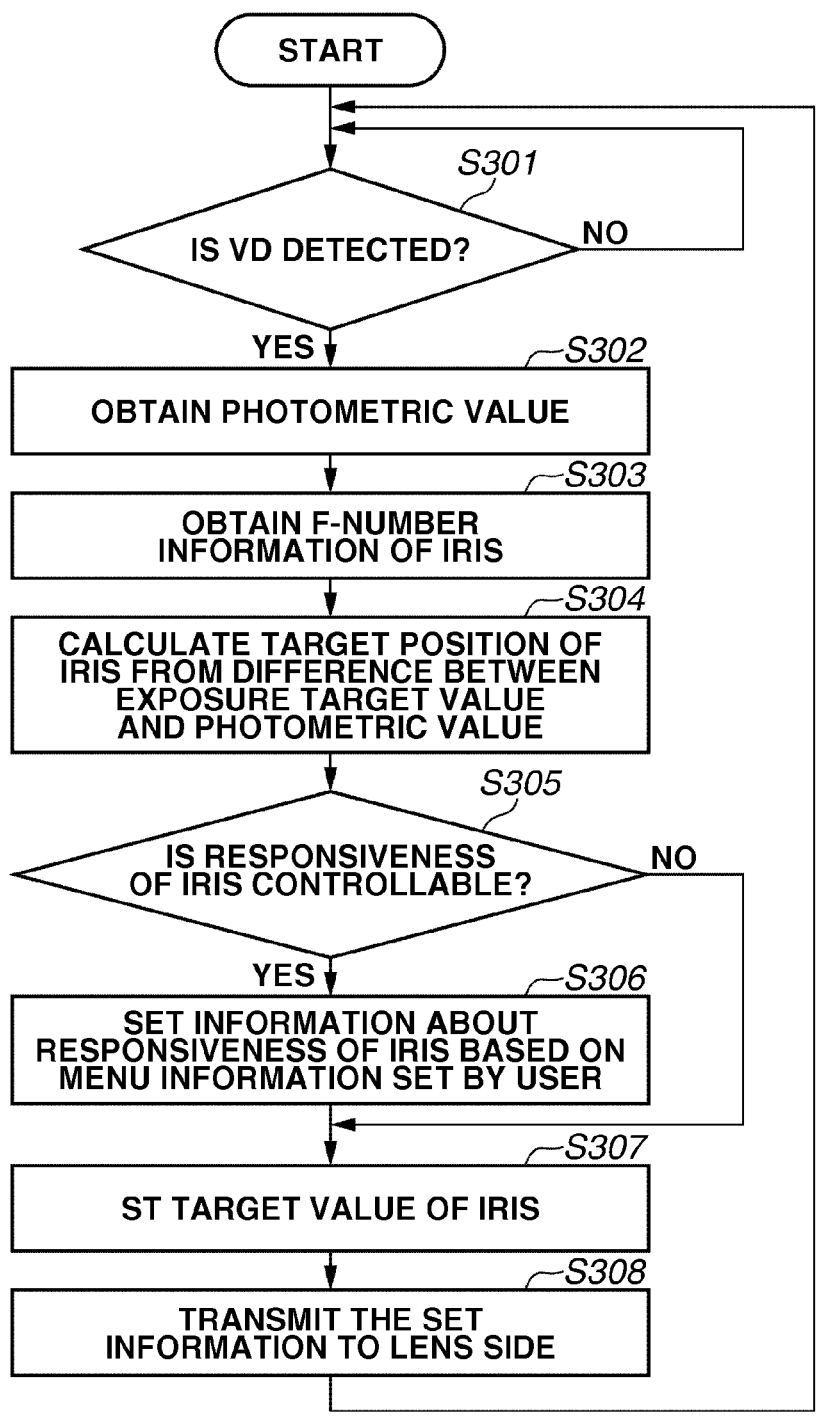
FIG. 3 is a flowchart 2 according to the exemplary embodiment.

Next, processing of a flowchart 2 according to the present exemplary embodiment and illustrated in FIG. 3 will be described.

The flowchart 2 illustrates a sequence of generating information to be communicated from the camera microcomputer 112 to the lens microcomputer 119. In step S301, the camera microcomputer 112 detects a VD via the VD transmission path 109 to determine whether to start processing of step S302. In step S302, the camera microcomputer 112 obtains a photometric value generated by the cameral signal processing circuit 106 via the photometric value transmission path 108. In step S303, the camera microcomputer 112 obtains F-number information of the iris 102 from the lens microcomputer 119 via communication. In step S304, the camera microcomputer 112 compares the photometric value obtained in step S302 with an exposure target value preset therein, and calculates a target position of the iris 102 from its difference value. For example, when it is determined, as a result of the comparison of the photometric value with the exposure target value, that the photometric value is darker by 1 EV than the exposure target value, the camera microcomputer 112 calculates an F-number brighter by 1 EV than a current F-number. Specifically, when the current F-number is F4.0, a calculation result is to be F5.6. Similarly, when it is determined, as a result of the comparison of the photometric value with the exposure target value, that the photometric value is brighter by 1 EV than the exposure target value, the camera microcomputer 112 calculates an F-number darker by 1 EV than a current F-number. Specifically, when the current F-number is F4.0, a calculation result is to be F2.8.

Figure 2:
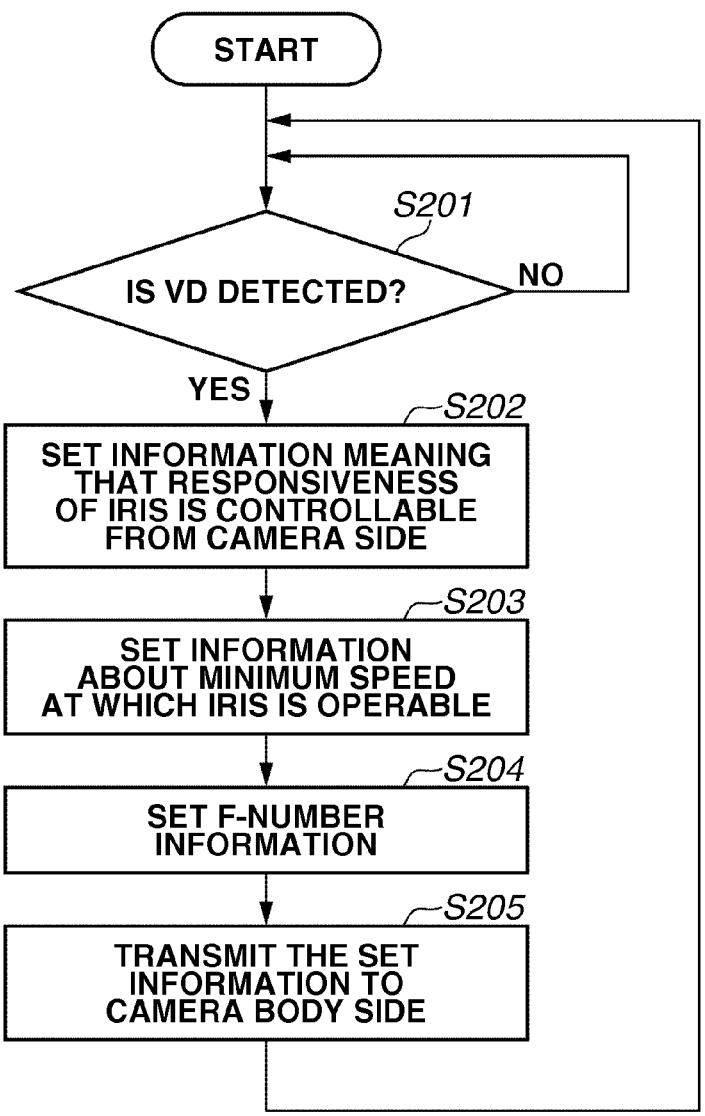
FIG. 2 is a flowchart 1 according to the exemplary embodiment.

Then, in step S305, the camera microcomputer 112 determines whether responsiveness of the iris 102 is controllable by the camera unit 121 based on the result of receiving the information set in step S202 illustrated in FIG. 2 by the camera microcomputer 112. When it is determined that the responsiveness of the iris 102 is controllable (YES in step S305), in step S306, the camera microcomputer 112 sets information about the responsiveness of the iris 102 selected and set beforehand by the user via the menu screen to be transmitted to the lens microcomputer 119. The information about the responsiveness of the iris 102 is defined by, for example, a light amount to be changed per unit time. When it is not determined that the responsiveness of the iris 102 is controllable (NO in step S305), in step S307, the camera microcomputer 112 sets the target position of the iris 102 calculated in step S304 to be transmitted to the lens microcomputer 119. The diaphragm responsiveness information generated by the generation unit in the camera microcomputer 112 is generated in view of information about the variable range of the controllable responsiveness of the diaphragm unit and stored in the storage unit. Then, in step S308, the camera microcomputer 112 transmits the pieces of information set in steps S306 and S307 to the lens microcomputer 119.

Figure 4:
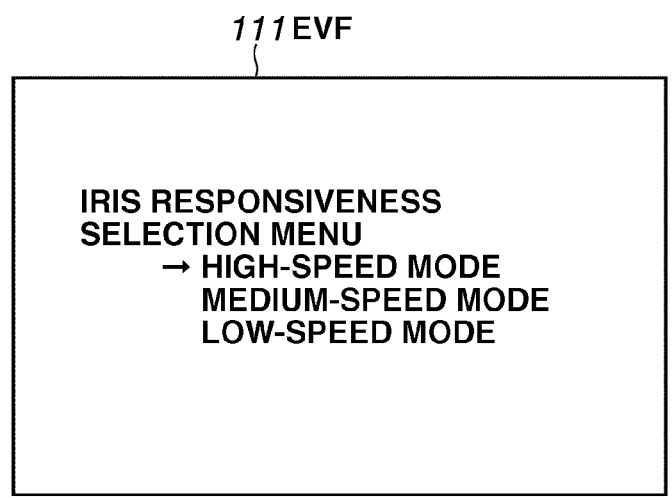
FIG. 4 illustrates a menu display example 1 for selecting iris responsiveness.
Figure 5:
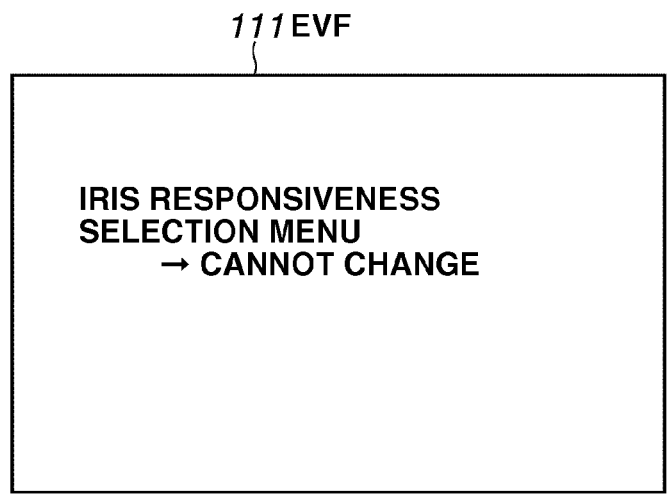
FIG. 5 illustrates a menu display example 2 for selecting iris responsiveness.

Next, referring to FIGS. 4 and 5, an example of a method for changing the responsiveness of the iris 102 via the menu screen by the user will be described. FIG. 4 illustrates the menu screen for changing the responsiveness of the iris 102 and which is displayed on the EVF 111. In the responsiveness selection menu of the iris 102, the user can select responsiveness of the iris 102 from three modes, i.e., a high-speed mode, a medium-speed mode, and a low-speed mode. The user can select responsiveness of the iris 102 by using the menu key 110 while the user watches the screen displayed on the EVF 111. FIG. 5 illustrates a display example indicating to the user that the responsiveness of the iris 102 cannot be switched from the responsiveness selection menu of the iris 102. Which of the example illustrated in FIG. 4 and the example illustrated in FIG. 5 is displayed is determined by determining whether the responsiveness of the iris 102 is controllable by the camera unit 121 in step S305 of the flowchart 2 illustrated in FIG. 3. Specifically, when the responsiveness of the iris 102 is controllable by the camera unit 121, as illustrated in FIG. 4, the screen menu enabling switching among the high-speed mode, the medium-speed mode, and the low-speed mode from the iris responsiveness selection menu is displayed. When the responsiveness of the iris 102 is not controllable by the camera unit 121, as illustrated in FIG. 5, inhibition of a change from the iris responsiveness selection menu is displayed. In other words, when the diaphragm unit cannot be controlled by the camera unit, selection of responsiveness by the selection unit is inhibited.

Figure 6:
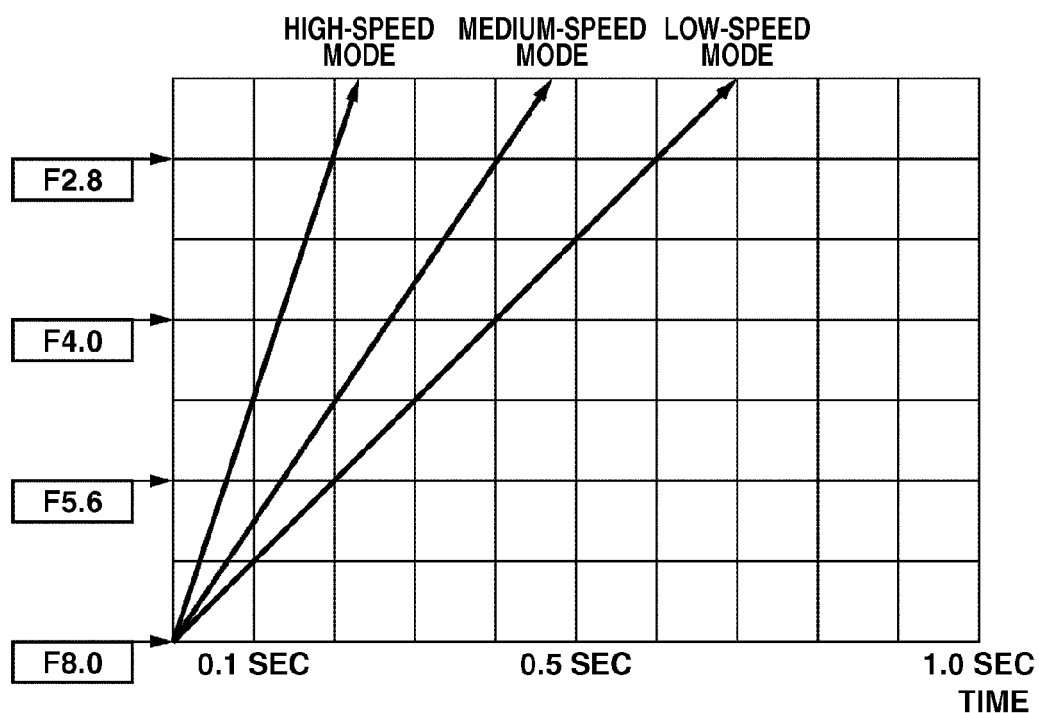
FIG. 6 illustrates a behavior where the iris changes.

Next, referring to FIG. 6, a behavior where the iris 102 changes when the responsiveness of the iris is changed on the iris responsiveness selection menu will be described. FIG. 6 illustrates the behavior where the F-number changes from F8.0 to F2.8 with the passage of time in each of the high-speed mode, the medium-speed mode, and the low-speed mode. In FIG. 6, the horizontal axis indicates time, and the vertical axis indicates an F-number. As can be understood from FIG. 6, F2.8 is reached within a shorter time in the high-speed mode than in the medium-speed mode. It takes longer to reach F2.8 in the low-speed mode than in the medium-speed mode. A specific flow changing the responsiveness of the iris 102 will be described. When the high-speed mode is selected on the iris responsiveness selection menu in step S306 of the flowchart 2 in FIG. 3, information for changing a light amount by 1.5 EV per 0.1 second is generated, and transmitted to the lens microcomputer 119. Similarly, when the medium-speed mode is selected on the iris responsiveness selection menu, information for changing the light amount by 0.75 EV per 0.1 second is generated, and transmitted to the lens microcomputer 119. Similarly, when the low-speed mode is selected on the iris responsiveness selection menu, information for changing the light amount by 0.5 EV per 0.1 second is generated, and transmitted to the lens microcomputer 119. The lens microcomputer 119 receives the information for changing the light amount per unit time as described above, and then controls the iris 102 via the iris control signal path 117.

Figure 7:
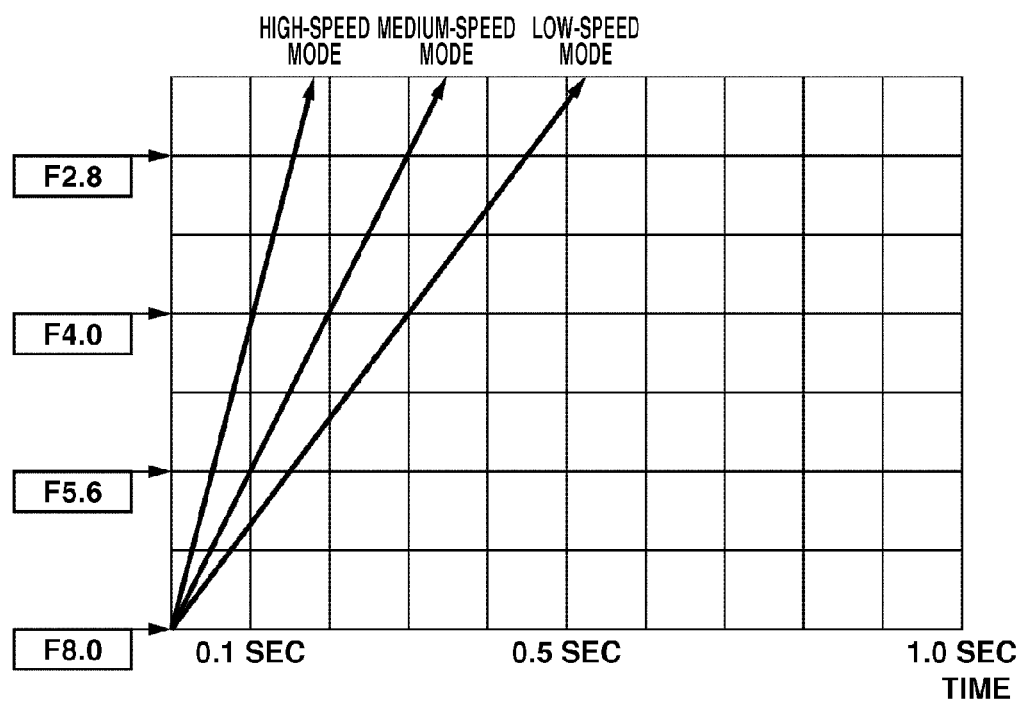
FIG. 7 illustrates another behavior where the iris changes.

Next, referring to FIG. 7, a case where the controllable responsiveness of the iris 102 can be controlled faster than that described above and referring to FIG. 6 will be described. As in the case of FIG. 6, FIG. 7 illustrates a behavior where the F-number changes from F8.0 to F2.8 with the passage of time in each of the high-speed mode, the medium-speed mode, and the low-speed mode. In FIG. 7, the horizontal axis indicates time, and the vertical axis indicates an F-number. A difference from FIG. 6 is in that time for reaching F2.8 from F8 is shorter in each of the high-speed mode, the medium-speed mode, and the low-speed mode. A specific flow of changing the responsiveness of the iris 102 will be described. In step S203 of the flowchart 1 in FIG. 2, information regarding the minimum speed at which the iris 102 can operate is set. In step S205, the information is transmitted to the camera unit 121. In other words, when the iris 102 cannot be controlled slow due to its performance, information regarding the minimum speed, at which an operation can be ensured, is transmitted to the camera unit 121. In step S306 of the flowchart 2 in FIG. 3, responsiveness of the iris 102 is set. At this time, the responsiveness must be set in view of information about a controllable minimum speed of the iris 102. Specifically, when, in step S203 of the flowchart 1 in FIG. 2, information about changing of the light amount by 0.5 EV per 0.1 second is set as information regarding the minimum speed at which the iris 102 can operate, an operation is performed as follows. When the low-speed mode is selected on the iris responsiveness selection menu, information indicating that the light amount is to be changed by at least 0.5 EV or more per 0.1 second must be generated to be transmitted to the lens microcomputer 119.

The exemplary embodiment of the present invention has been described. However, the present invention is not limited to the exemplary embodiment. Various embodiments without departing from the gist of the present invention are within the invention. Some parts of the exemplary embodiment can be arbitrarily combined.

According to the exemplary embodiment of the present invention, the information about the controllable responsiveness (light amount change per unit time) of the diaphragm unit and stored in the lens unit can be communicated from the lens unit to the camera unit. This enables the camera unit to obtain information about the variable range of the controllable responsiveness according to the mounted lens unit. As a result, the camera unit can set responsiveness of the diaphragm unit within the variable range of the responsiveness. Thus, a system capable of realizing a function of selecting responsiveness of the diaphragm unit from, for example, the high-speed mode, the medium-speed mode, and the low-speed mode can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-187064 filed Aug. 27, 2012, which is hereby incorporated by reference herein in its entirety.

What is claimed is:

1. An imaging apparatus comprising:
   a sensor configured to photoelectrically convert light from an object to output a signal;
   a selection unit configured to select one of a first exposure control mode and a second exposure control mode having an exposure changing amount per unit time larger than that of the first exposure control mode; and
   a controller configured to perform control to transmit diaphragm control information in a case where a speed of a diaphragm unit is controllable, and to inhibit the selection of the exposure control mode in a case where a speed of the diaphragm unit is uncontrollable,
   wherein the diaphragm control information is generated based on the output signal from the sensor, first information, and second information to a connected lens unit, and
   wherein the first information is about the exposure control mode selected by the selection unit, and the second information is speed information of the diaphragm unit corresponding to the lens unit.

2. The imaging apparatus according to claim 1, wherein the speed information of the diaphragm unit corresponds to information obtained from the connected lens unit.

3. The imaging apparatus according to claim 1, further comprising memory utilized as a storage unit configured to store speed information of a control unit of the connected lens unit.

4. The imaging apparatus according to claim 1, wherein the selection unit selects the exposure control mode by an operation from a source outside of the imaging apparatus.

5. The imaging apparatus according to claim 1, wherein the diaphragm control information is transmitted to the connected lens unit via a communication unit.

6. The imaging apparatus according to claim 1, wherein the speed information of the diaphragm unit includes information about a variable range of controllable responsiveness of the diaphragm unit.

7. The imaging apparatus according to claim 1, wherein the speed information of the diaphragm unit is generated in association with stored information about a variable range of controllable responsiveness of the diaphragm unit.

8. The imaging apparatus according to claim 1, wherein the speed information of the diaphragm unit indicates a minimum speed at which the diaphragm unit is able to be driven.

* * * * *